US010946866B2

(12) United States Patent
Fahim et al.

(10) Patent No.: US 10,946,866 B2
(45) Date of Patent: Mar. 16, 2021

(54) CORE TIGHTLY COUPLED LOCKSTEP FOR HIGH FUNCTIONAL SAFETY

(71) Applicant: Intel Corporation, Santa Clara, CA (US)

(72) Inventors: Bahaa Fahim, Santa Clara, CA (US); Riccardo Mariani, Pisa (IT); Dean Mulla, Saratoga, CA (US); Robert Gottlieb, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 15/942,466

(22) Filed: Mar. 31, 2018

(65) Prior Publication Data

US 2019/0047579 A1   Feb. 14, 2019

(51) Int. Cl.
| | |
|---|---|
| *B60W 50/023* | (2012.01) |
| *B60W 50/02* | (2012.01) |
| *B60R 16/023* | (2006.01) |
| *B60W 50/00* | (2006.01) |

(52) U.S. Cl.
CPC ....... *B60W 50/023* (2013.01); *B60R 16/0231* (2013.01); *B60W 50/0098* (2013.01); *B60W 50/0205* (2013.01); *B60W 50/0225* (2013.01); *B60W 2050/021* (2013.01); *B60W 2050/0215* (2013.01)

(58) Field of Classification Search
CPC ........... B60W 50/023; B60W 50/0098; B60W 50/0205; B60W 50/0225; B60W 2050/0215; B60W 2050/021; B60R 16/0231
See application file for complete search history.

(56) References Cited

U.S. PATENT DOCUMENTS

| | | | |
|---|---|---|---|
| 4,099,234 A | 7/1978 | Woods | |
| 6,247,143 B1 | 6/2001 | Williams | |
| 6,357,033 B1 | 3/2002 | Jippo | |
| 8,438,306 B2 * | 5/2013 | De Lescure | ............ G06F 15/16 709/238 |
| 8,930,752 B2 * | 1/2015 | Gara | ................... G06F 11/1641 714/11 |
| 2002/0152418 A1 | 10/2002 | Griffin | |
| 2002/0152420 A1 | 10/2002 | Chaudhry | |

(Continued)

FOREIGN PATENT DOCUMENTS

WO   PCT/EP18/053218   *   2/2018   ........... B64G 1/1085

*Primary Examiner* — Russell Frejd
(74) *Attorney, Agent, or Firm* — Spectrum IP Law Group LLC

(57) ABSTRACT

Methods and apparatus relating to provision of core tightly coupled lockstep for high functional safety are described. In an embodiment, a master core, coupled to a slave core, executes one or more operations to support Advanced Driver Assistance Systems (ADA) or autonomous driving. The master core and the slave core receive the same input signal and core tightly couple logic causes generation of a signal in response to comparison of a first output from the master core and a second output from the slave core. The generated signal causes an interruption of the one or more operations in response to a mismatch between the first output and the second output. Other embodiments are also disclosed and claimed.

22 Claims, 7 Drawing Sheets

(56) References Cited

U.S. PATENT DOCUMENTS

| | | | |
|---|---|---|---|
| 2003/0005380 A1* | 1/2003 | Nguyen | G06F 11/273 |
| | | | 714/736 |
| 2005/0240793 A1 | 10/2005 | Safford | |
| 2006/0248288 A1 | 11/2006 | Bruckert | |
| 2011/0179308 A1 | 7/2011 | Pathirane | |
| 2012/0210164 A1 | 8/2012 | Gara | |
| 2018/0129573 A1* | 5/2018 | Iturbe | G06F 11/0793 |
| 2019/0163583 A1 | 5/2019 | Fahim | |
| 2019/0182415 A1* | 6/2019 | Sivan | H04W 4/80 |
| 2019/0389602 A1* | 12/2019 | Schilling | B64G 1/285 |

* cited by examiner

CORE TIGHTLY COUPLED LOCKSTEP FOR HIGH FUNCTIONAL SAFETY

FIELD

The present disclosure generally relates to the field of electronics. More particularly, an embodiment relates to provision of core tightly coupled lockstep for high functional safety.

BACKGROUND

Autonomous driving or ADAS (Advanced Driver Assistance Systems) promises a world where a vehicle can transport its passengers from point A to point B with ultimate safety and with minimal human intervention. At the same time, well-publicized accidents cast a shadow on trustworthiness of autonomous driving systems.

To address such issues, various components utilized to provide autonomous driving systems would have to operate with high functional safety.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
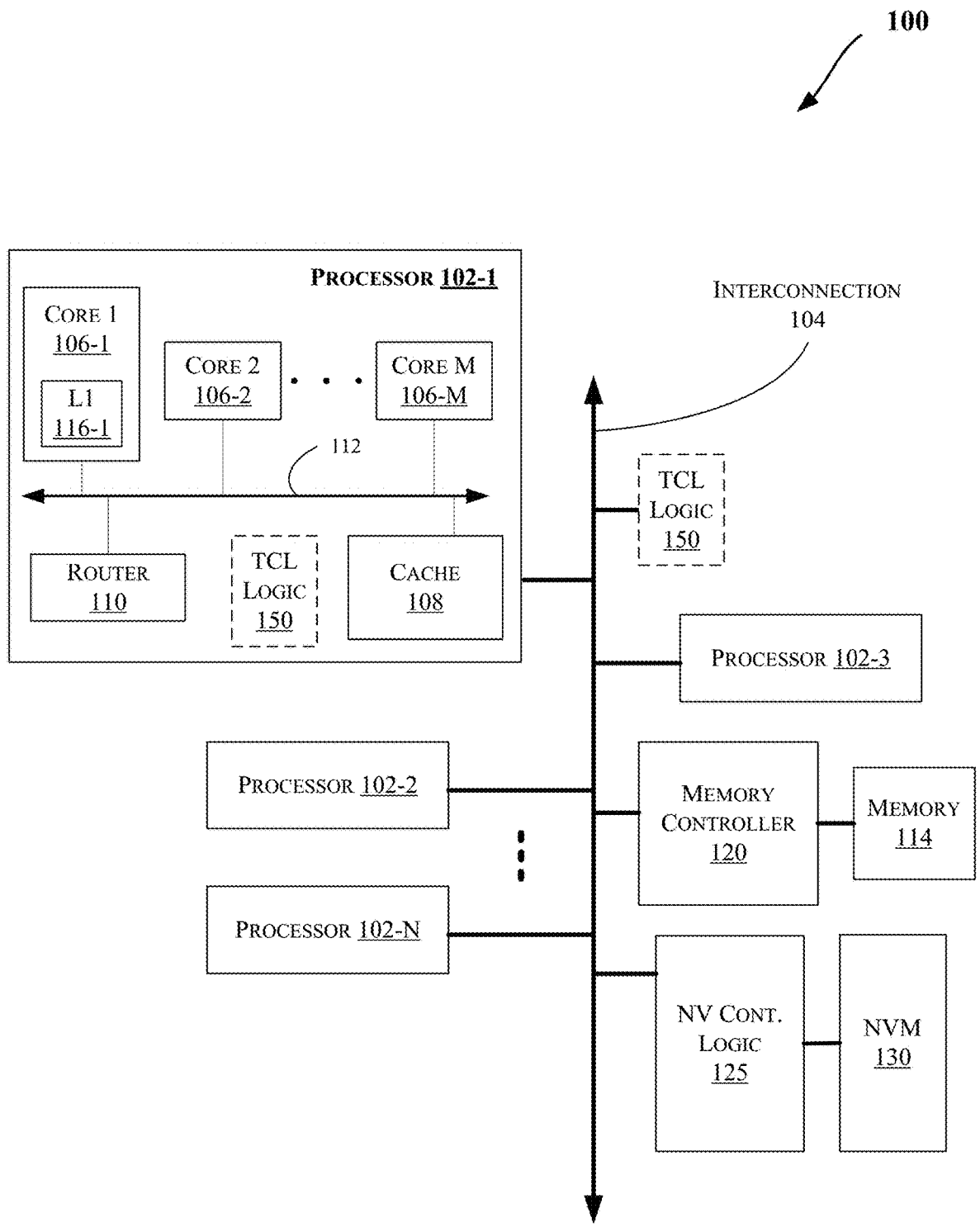
FIG. 1 illustrates a block diagram of a computing system, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, various components utilized to provide autonomous driving systems would have to operate with high functional safety to avoid potential accidents. Moreover, the past few years have witnessed significant innovations in data center usage models geared towards utilization of immense compute power, driven by a combination of Moore's law and significant innovations in CPU micro-architecture. One of these key areas of innovation is the autonomous vehicles or ADAS (Advanced Driver Assistance Systems) which is a fast growing segment with significant potential for advancing human productivity through offloading operational effort to a high compute system, e.g., a data center-on-wheels with significant compute power.

Part of this significant advancement has been the result of innovations in core micro-architecture and design. Computing cores have, as a result, substantially grown in complexity and number of devices. Random computing elements in the core do not benefit from traditional SER (or Soft Error Rate) reduction techniques (such as Parity or ECC (Error Correcting Code)) and therefore, the cores are a significant contributor to the overall processor or Central Processor Unit (CPU) Failure In Time (FIT). Furthermore, recent generations have witnessed a significant rise in the number of multi-threaded applications and number of cores integrated on a single processor chip to several dozen cores with a clear upwards trend in future CPUs. This implies that the reduction of the core failure rate is paramount to functional safety segments (such as ADAS). Some techniques may address this through CPU-level lockstep, which not only has significant challenges due to socket level determinism, but it also has significant software implications, resulting in readily-available software not immediately being portable to ADAS-capable processors, therefore increasing customer costs, and also significant performance impacts due to running redundant copies of a virtual machine (with duplicated memory space). Some solutions in the ADAS market may use dual CPU implementations for redundancy which adds significant power and area cost to the critical ADAS market.

To this end, some embodiments relate to provision of core tightly coupled lockstep for high functional safety. At least one embodiment provides (e.g., a pay-as-you go) reliability in ADAS, which may provide coverage for the entire space of various logic in computing processor cores without requiring full-chip (e.g., CPU-level) determinism and is (e.g., completely) transparent to software. Such embodiments may also provide a mechanism to tradeoff performance and functional safety for different Functional Safety usage models. This allows a single channel (e.g., without CPU-level redundancy/lockstep) design with significant power and/or performance gains over prior solutions.

To support core tightly coupled lockstep functionality for high functional safety, one or more components may be provided in an automotive vehicle. For example, with reference to FIG. 1, these one or more components provided may include one or more of: the processor 102, core 106, cache 108, memory controller 120, memory 114, NV controller logic 125, NVM 130, etc. Further, logic 150 may be provided in various locations (including those shown in FIG. 1) to support core tightly coupled lockstep functionality for high functional safety.

As discussed herein the "cores" generally refer to hardware logic capable of performing one or more operations to support one or more ADAS operations (including autonomous driving system operation(s)). For example, a core may include electronic processing circuitry such as one or more processors/cores (such as general-purpose and/or graphics processors/cores), PLA (Programmable Logic Array), SoC, ASIC (Application Specific Integrated Circuit), PGA (Programmable Gate Array) or FPGA (Field PGA) logic, etc. Also, as discussed herein, an "automotive" vehicle generally refers to any vehicle capable of operating in accordance with (or in response to) operation(s) performed by core(s) of a multi-core processor, including by way of example an automobile, a truck, a motorcycle, an airplane, a helicopter, etc., whether or not the vehicle is a passenger or commercial vehicle and regardless of the power source type used to move the vehicle.

More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a processor cache 108 (which may be a shared cache or a private cache in various embodiments), and/or a router 110. The processor cores 106 may be implemented on a single integrated circuit (IC) chip. Moreover, the chip may include one or more shared and/or private caches (such as processor cache 108), buses or interconnections (such as a bus or interconnection 112), logic 120, memory controllers (such as those discussed with reference to FIGS. 4-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The processor cache 108 may store data (e.g., including instructions) that are utilized by one or more components of the processor 102-1, such as the cores 106. For example, the processor cache 108 may locally cache data stored in a memory 114 for faster access by the components of the processor 102. As shown in FIG. 1, the memory 114 may be in communication with the processors 102 via the interconnection 104. In an embodiment, the processor cache 108 (that may be shared) may have various levels, for example, the processor cache 108 may be a mid-level cache and/or a last-level cache (LLC). Also, each of the cores 106 may include a level 1 (L1) processor cache (116-1) (generally referred to herein as "L1 processor cache 116"). Various components of the processor 102-1 may communicate with the processor cache 108 directly, through a bus (e.g., the bus 112), and/or a memory controller or hub.

As shown in FIG. 1, memory 114 may be coupled to other components of system 100 through a memory controller 120. Memory 114 includes volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

System 100 also includes NV memory 130 (or Non-Volatile Memory (NVM), e.g., compliant with NVMe (NVM express)) coupled to the interconnect 104 via NV controller logic 125. Hence, logic 125 may control access by various components of system 100 to the NVM 130. Furthermore, even though logic 125 is shown to be directly coupled to the interconnection 104 in FIG. 1, logic 125 may communicate via a storage bus/interconnect (such as the SATA (Serial Advanced Technology Attachment) bus, Peripheral Component Interconnect (PCI) (or PCI express (PCIe) interface), etc.) with one or more other components of system 100 (for example where the storage bus is coupled to interconnect 104 via some other logic like a bus bridge, chipset (such as discussed with reference to FIGS. 4-7), etc.). Additionally, logic 125 may be incorporated into memory controller logic (such as those discussed with reference to FIGS. 4-7) or provided on a same Integrated Circuit (IC) device in various embodiments (e.g., on the same IC device as the NVM 130 or in the same enclosure as the NVM 130). System 100 may also include other types of non-volatile memory such as those discussed with reference to FIGS. 4-7, including for example a hard disk drive, etc.

Further, no current solutions exist to provide similar fault coverage without significant silicon (e.g., including redundant CPU and memory associated with the redundant CPU socket) or software impacts (e.g., to support the synchronization and redundancy for the additional hardware). Some implementations may provide solutions through Loosely Coupled Lockstep (LCL) mechanisms at the CPU level. The ADAS platform area/power delivery impact associated with the extra CPU/memory are all very prohibitive and put significant constraints on solutions in that market segment. In addition, the LCL mechanism is significantly more impactful for cache and memory bandwidth due to duplication of activity across the entire CPU and not just the cores. Yet, without embodiments disclosed herein, the LCL solutions persist because of the need to achieve a high functional safety (such as ASIL (Automotive Safety Integrity Level) and its variations such as ASIL-D, etc.) at the platform, while each CPU is at a significantly lower functional safety level.

By contrast, the core Tightly Coupled Lockstep (TCL) techniques described herein (in accordance with one or more embodiments) are far more superior than any of the other implementations. For example, a core tightly coupled lockstep embodiment may provide a hardware based mechanism that leverages core-level determinism without requiring socket level determinism, e.g. to implement redundancy across two cores. This can be done through driving mainband and side-band interfaces to the core in a deterministic manner and comparing checksums of selected output bits from the two cores to ensure coverage, e.g., even while the uncore fabrics are inherently non-deterministic.

Additionally, one or more embodiments address both transient and permanent faults due to redundant processing over two different cores, while not requiring determinism. Such embodiments may be implemented with very minimal physical impact, no impact to cores, or software as software may be fully unaware of such mechanisms. Moreover, such embodiments may operate in conjunction with an Uncore Functional Safety Mechanism (UCSF) logic to provide very high levels of functional safety for the entire CPU (e.g., for ASIL). For example, a UCSF logic may guarantee the functional safety through redundancy (e.g., because there is no determinism requirements). This, in turn, allows customers to give up a redundant CPU (and the associated area, cost, and/or performance impact) which presents a significant value. UCSF may be covering non-lockstepped, non-deterministic portions of the CPU (such as components outside the core) that would be orthogonal to the lockstepped, deterministic mechanism described here.

In one embodiment, the cores discussed herein may be included in an IoT device. Moreover, an "IoT" device generally refers to a device which includes electronic processing circuitry (such as one or more processor/cores, PLA (Programmable Logic Array), SoC, ASIC (Application Specific Integrated Circuit), etc.), memory (e.g., to store software or firmware), one or more sensors (or is otherwise coupled to one or more sensors such as a camera, motion detector, etc.), and network connectivity to allow the IoT device to collect and/or exchange data. IoT devices can be cheaper than traditional computing devices to allow for their proliferation at remote locations. IoT devices can also reduce costs by using existing infrastructure (such as the Internet, a (third generation (3G), fourth generation (4G), or fifth generation (5G) cellular/wireless network, etc.). More generally, an IoT device may include one or more components such as those discussed with reference to FIG. 1 et seq.

Figure 2:
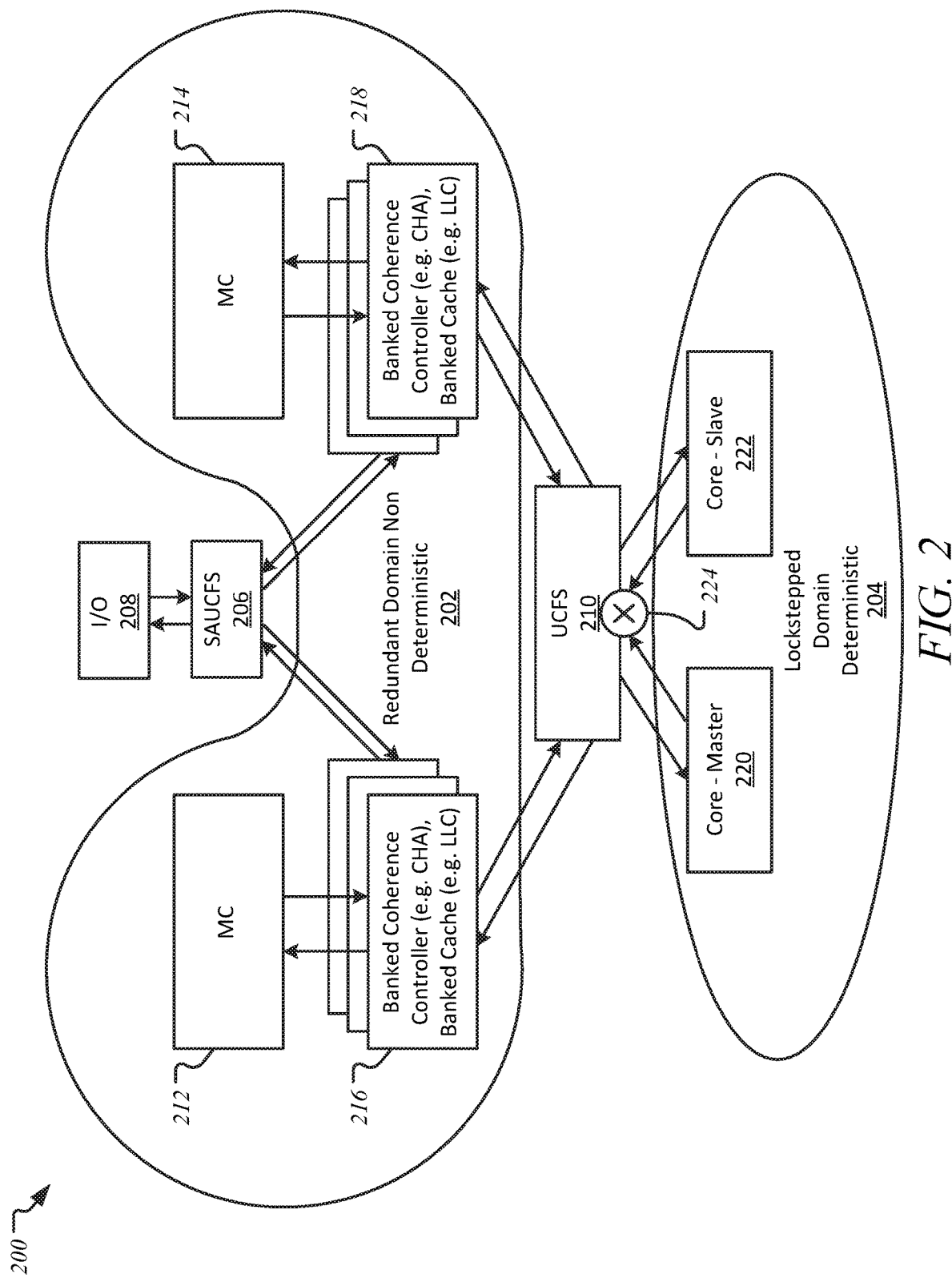
FIGS. 2 and 3 illustrate block diagrams of systems to provide Core Tightly Coupled Lockstep mechanisms, according to some embodiments.

FIG. 2 illustrates a block diagram of a system 200 to provide a Core Tightly Coupled Lockstep mechanism, according to an embodiment. Moreover, FIG. 2 shows a CPU core-level level lockstep, which provides a very high level of transient and permanent fault coverage when combined with the redundant uncore domain. One or more components of system 200 may be provided on a single integrated circuit chip/device (e.g., as an SoC) and/or in a processor in various embodiments. In at least one embodiment, TCL logic 150 of FIG. 1 includes logic 206 and/or logic 210 of system 200.

As shown, system 200 includes a redundant non-deterministic domain 202 and a lock-stepped deterministic domain 204. Domain 202 communicates with SAUCFS logic 206 (and via 206 with I/O (Input/Output) 208; e.g., SAUCFS (System Agent Uncore Coherent Functional Safety) logic 206 provides I/O redundancy for I/O read that may fail or collapse). Domains 202 and 204 communicate via UCFS logic 210. Domain 202 includes memory controllers 212 and 214 (which may be the same or similar to memory controllers discussed herein with reference to the other figures), as well as one or more banked coherence controllers (e.g., CHA or Caching and Home Agent) and banked cache (e.g., LLC) 216/218. Domain 204 includes a plurality of cores such as a master core 220 and a slave core 222 as will be further discussed herein.

Moreover, Core Tightly Coupled Lockstep (TCL) implements a mechanism where all messages from uncore to core are deterministically driven to both a master core (e.g., 220) and slave core (e.g., 222) even though the CPU uncore/SoC fabrics to those core tiles are not designed to be deterministic. The master and slave core pairs are physically adjacent cores (e.g., vertically or horizontally depending on specific CPU floorplan) and each of those cores could operate in either a lock-stepped (functional safety) or a non-lock stepped (normal) modes of operation, which may be configured through logic/firmware (e.g., logic 150) at an early point in the boot process (e.g., prior to core reset de-assertion).

Figure 3:
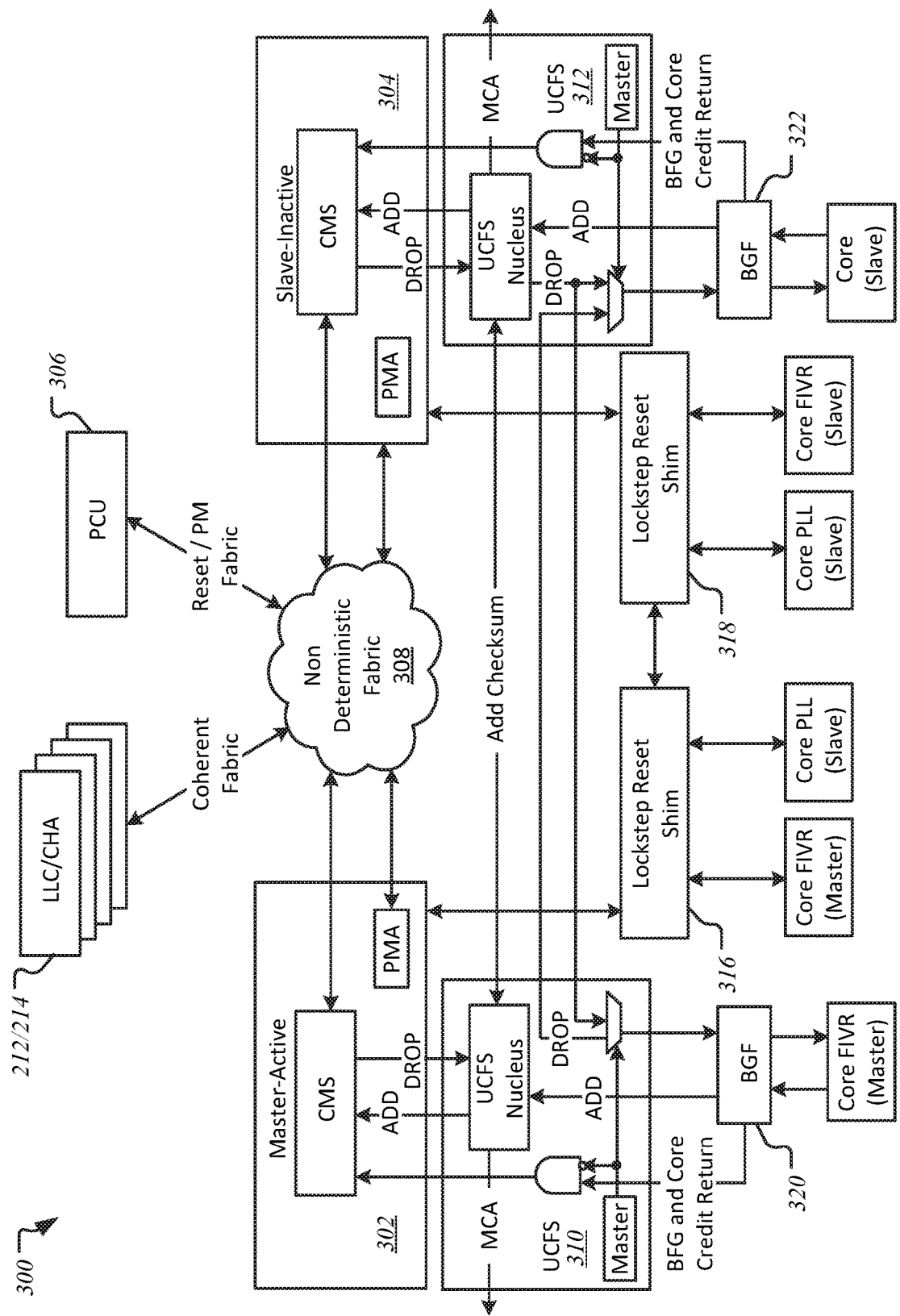

FIG. 3 illustrates a block diagram of a system 300 to provide a Core Tightly Coupled Lockstep mechanism, according to an embodiment. One or more components of system 300 may be provided on a single integrated circuit chip/device (e.g., as an SoC) and/or in a processor in various embodiments. As shown in FIG. 3, system 300 indicates how a master and a salve Content Management System (CMS) 302/304 may be utilized in conjunction with a Power Control Unit (PCU) 306. In at least one embodiment, TCL logic 150 of FIG. 1 includes logic 308, 310, and/or 312 of system 300.

In some embodiments, for cores (e.g., domain 204 of FIG. 2 or core(s) of FIG. 3) that are configured to operate in lockstep, uncore (e.g., components other than the two cores) ensures that all inputs are assigned in a cycle-consistent manner including all resets and clocks. One core is enabled as the master, and all input messages/signals issued to that master core is also driven to the slave core (e.g., via UCFS logic 210, 310, and/or 312). The slave core provides an ability to determine when the slave and master cores diverge due to possible functional faults. In an embodiment, the master interfaces are driven to the slave core over a fixed number of cycles, and the master (or logic 150) compensates for that slave transit time latency through additional staging locally. In particular, the coherent fabric is completely mirrored across both cores and only one of the interconnect stops (e.g., mesh stop or ring stop) processes messages destined to the lock-stepped pair which is observed as a single core to the rest of the CPU (and software). Messages received from the mesh are issued in a latency matched manner to both master and slave cores, while outputs from the cores are compared.

In one embodiment, only outputs from the master core actually propagate to the coherent fabric, while messages from the slave core are dropped (hence, the slave core is not contributing to overhead). This ensures that despite the coherent interconnect being non-deterministic, the coherent core interface (IDI or Intra-Die Interface) remains deterministic. Similarly, the global reset and Power Management (PM) fabrics are also non-deterministic, and, even though both lock-stepped cores are operating at (e.g., exactly) identical or equivalent voltage/frequency points while maintaining independent PLL (Phase-Locked Loop or clock generation circuitry) and FIVR (Fully Integrated Voltage Regulator or on-die voltage regulator), reset events around both need to be done in lockstep to guarantee that the core reset remains in lockstep and fully synchronized. This is achieved through logic shim 316/318 (coupled to PMAs or Power Management Agents, where the PMAs are distributed portions of the PCU to ensure determinism for synchronization, reset, power-based throttling, etc.). These shims can ensure that critical controls and status interfaces are merged between both master/slave PLL and FIVR units to ensure determinism.

Outputs from both master and slave cores are coalesced down via an XOR function (e.g., logic 224 of FIG. 2) to calculate a checksum. This is done to take advantage of physical proximity of routing for existing interfaces while providing enough checksum bits (such as including every other physically adjacent wire into the same parity XOR tree) to ensure protection against multiple bit upsets (MBUs). That checksum is compared between the two cores and any mismatches are reported to the safety monitor to communicate loss of lockstep behavior (e.g., to trigger an interrupt or signal/message to interrupt the safe mode and exit autonomous driving or ADAS operation(s)).

In one embodiment, the TCL mechanism is implemented without the core(s) being aware of the lockstep operation in the uncore, which can be useful because computing cores may also be used in various market segments that cannot afford to incur the overhead of lockstep operations but may be able to tolerate a significantly higher failure rate. Also, even on ADAS CPUs, there can be a mixture of lock stepped and non-lock stepped cores based on customer usage model. Similarly, the rest of the CPU uncore coherent fabric may not be aware of the lock stepped implementation. In an embodiment, for the CPU uncore coherent fabric, only the master is enabled, and the fact the slave core is also processing an image of the master is not visible to the rest of the CPU.

The subset of interfaces shared between the master and slave cores include interfaces that would be used in normal operation and could affect determinism. These include reset, sideband, and main-band interfaces, but do not include DFT (Design For Test) interfaces or cache repair fuses which are required to be distinct per core and do not have an impact on determinism. Furthermore, the bandwidth of the routing channel from the master to the slave could be reduced through throttling the mesh agent (CMS) and time-multiplexing interfaces on the same flow control class to reduce wiring impacts. This provides greater flexibility to tradeoff performance and functional safety based on application needs of the targeted segment. To this end, FIG. 3 illustrates the shared "DROP" (or uncore to core) interfaces (via Bubble Generator FIFO (First In, First Out) or BGF buffers 320/322) and the checksum computation across the master and slave cores.

In at least one embodiment, other than the computation of the checksum, the slave core outputs are dropped and never issued to the rest of the uncore. This is because those outputs are redundant with the master outputs which are forwarded to the on-die fabric. This has significant savings in memory and cache bandwidth over other approaches, which may include redundant memory and cache bandwidth/capacity to achieve coverage without a hardware implementation.

Figure 4:
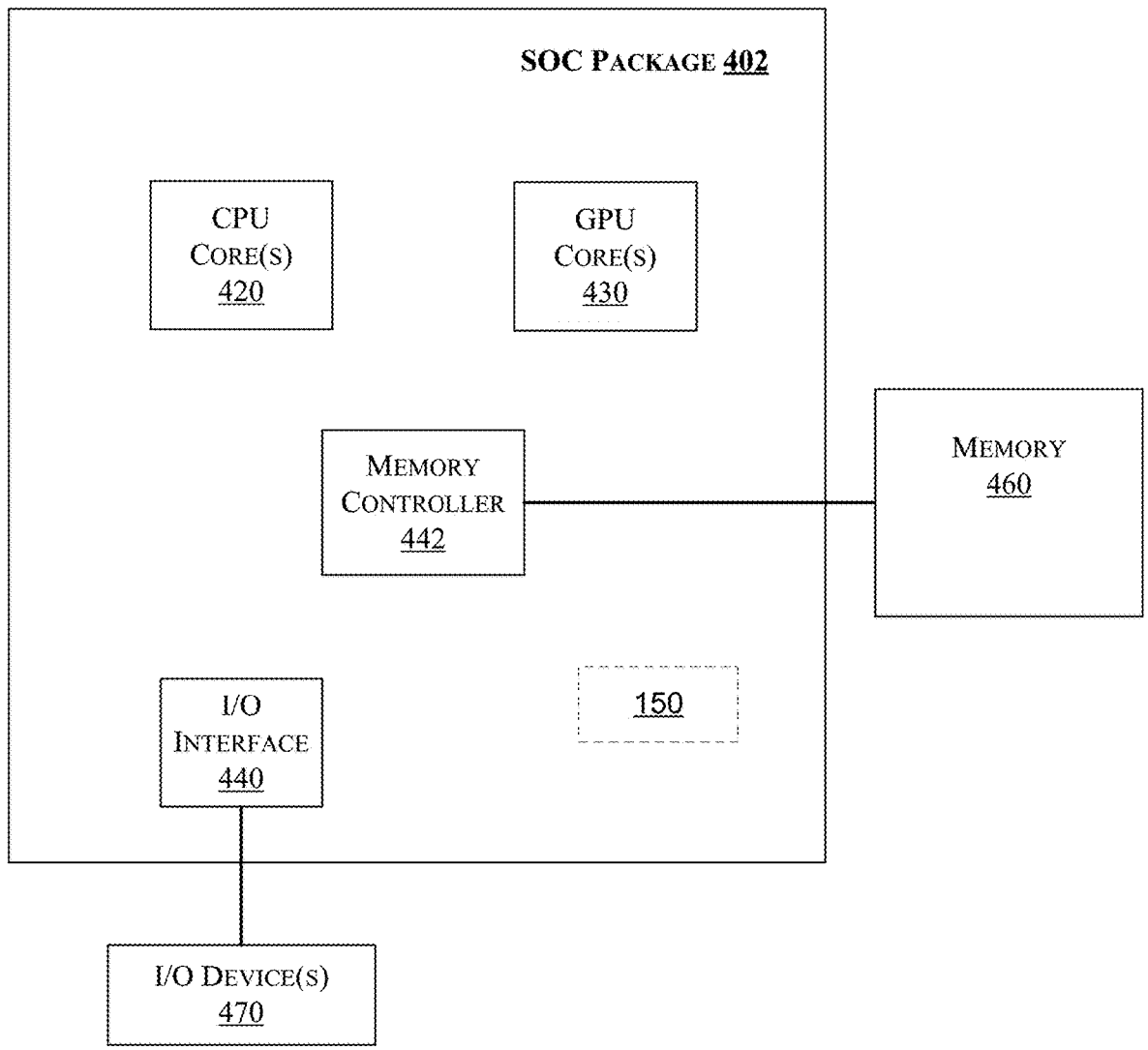
FIGS. 4 and 5 illustrates block diagrams of embodiments of computing systems, which may be utilized in various embodiments discussed herein.

FIG. 4 illustrates a block diagram of an SOC package in accordance with an embodiment. As illustrated in FIG. 4, SOC 402 includes one or more Central Processing Unit (CPU) cores 420, one or more Graphics Processor Unit (GPU) cores 430, an Input/Output (I/O) interface 440, and a memory controller 442. Various components of the SOC package 402 may be coupled to an interconnect or bus such as discussed herein with reference to the other figures. Also, the SOC package 402 may include more or less components, such as those discussed herein with reference to the other figures. Further, each component of the SOC package 420 may include one or more other components, e.g., as discussed with reference to the other figures herein. In one embodiment, SOC package 402 (and its components) is provided on one or more Integrated Circuit (IC) die, e.g., which are packaged into a single semiconductor device.

As illustrated in FIG. 4, SOC package 402 is coupled to a memory 460 via the memory controller 442. In an embodiment, the memory 460 (or a portion of it) can be integrated on the SOC package 402.

The I/O interface 440 may be coupled to one or more I/O devices 470, e.g., via an interconnect and/or bus such as discussed herein with reference to other figures. I/O device(s) 470 may include one or more of a keyboard, a mouse, a touchpad, a display, an image/video capture device (such as a camera or camcorder/video recorder), a touch screen, a speaker, or the like.

Figure 5:
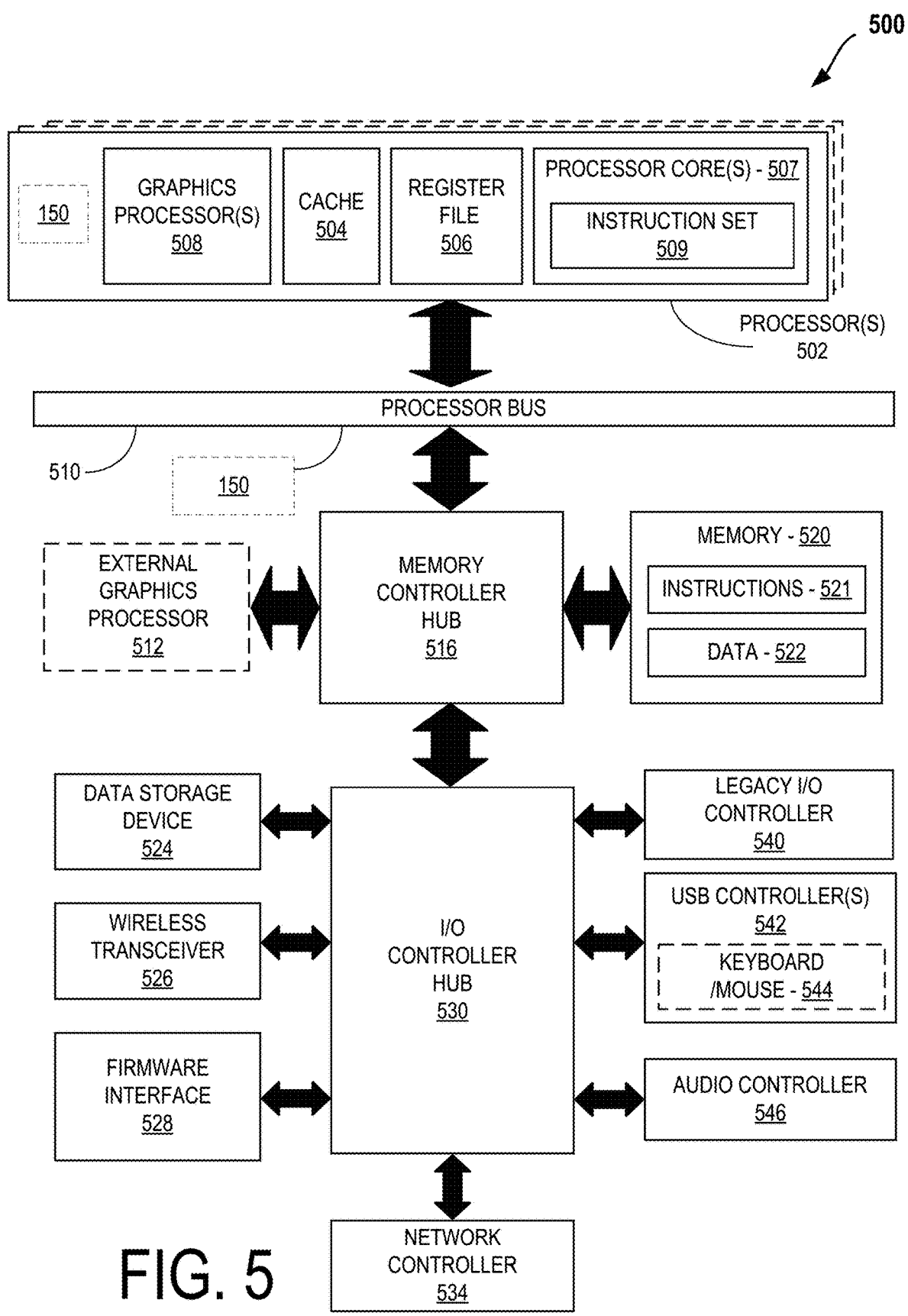

FIG. 5 is a block diagram of a processing system 500, according to an embodiment. In various embodiments the system 500 includes one or more processors 502 and one or more graphics processors 508, and may be a single processor desktop system, a multiprocessor workstation system, or a server system having a large number of processors 502 or processor cores 507. In on embodiment, the system 500 is a processing platform incorporated within a system-on-a-chip (SoC or SOC) integrated circuit for use in mobile, handheld, or embedded devices.

An embodiment of system 500 can include, or be incorporated within a server-based gaming platform, a game console, including a game and media console, a mobile gaming console, a handheld game console, or an online game console. In some embodiments system 500 is a mobile phone, smart phone, tablet computing device or mobile Internet device. Data processing system 500 can also include, couple with, or be integrated within a wearable device, such as a smart watch wearable device, smart eyewear device, augmented reality device, or virtual reality device. In some embodiments, data processing system 500 is a television or set top box device having one or more processors 502 and a graphical interface generated by one or more graphics processors 508.

In some embodiments, the one or more processors 502 each include one or more processor cores 507 to process instructions which, when executed, perform operations for system and user software. In some embodiments, each of the one or more processor cores 507 is configured to process a specific instruction set 509. In some embodiments, instruction set 509 may facilitate Complex Instruction Set Computing (CISC), Reduced Instruction Set Computing (RISC), or computing via a Very Long Instruction Word (VLIW). Multiple processor cores 507 may each process a different instruction set 509, which may include instructions to facilitate the emulation of other instruction sets. Processor core 507 may also include other processing devices, such a Digital Signal Processor (DSP).

In some embodiments, the processor 502 includes cache memory 504. Depending on the architecture, the processor 502 can have a single internal cache or multiple levels of internal cache. In some embodiments, the cache memory is shared among various components of the processor 502. In some embodiments, the processor 502 also uses an external cache (e.g., a Level-3 (L3) cache or Last Level Cache (LLC)) (not shown), which may be shared among processor cores 507 using known cache coherency techniques. A register file 506 is additionally included in processor 502 which may include different types of registers for storing different types of data (e.g., integer registers, floating point registers, status registers, and an instruction pointer register). Some registers may be general-purpose registers, while other registers may be specific to the design of the processor 502.

In some embodiments, processor 502 is coupled to a processor bus 510 to transmit communication signals such as address, data, or control signals between processor 502 and other components in system 500. In one embodiment the system 500 uses an exemplary 'hub' system architecture, including a memory controller hub 516 and an Input Output (I/O) controller hub 530. A memory controller hub 516 facilitates communication between a memory device and other components of system 500, while an I/O Controller Hub (ICH) 530 provides connections to I/O devices via a local I/O bus. In one embodiment, the logic of the memory controller hub 516 is integrated within the processor.

Memory device 520 can be a dynamic random access memory (DRAM) device, a static random access memory (SRAM) device, flash memory device, phase-change memory device, or some other memory device having suitable performance to serve as process memory. In one embodiment the memory device 520 can operate as system memory for the system 500, to store data 522 and instructions 521 for use when the one or more processors 502 executes an application or process. Memory controller hub 516 also couples with an optional external graphics processor 512, which may communicate with the one or more graphics processors 508 in processors 502 to perform graphics and media operations.

In some embodiments, ICH 530 enables peripherals to connect to memory device 520 and processor 502 via a high-speed I/O bus. The I/O peripherals include, but are not limited to, an audio controller 546, a firmware interface 528, a wireless transceiver 526 (e.g., Wi-Fi, Bluetooth), a data storage device 524 (e.g., hard disk drive, flash memory, etc.), and a legacy I/O controller 540 for coupling legacy (e.g., Personal System 2 (PS/2)) devices to the system. One or more Universal Serial Bus (USB) controllers 542 connect input devices, such as keyboard and mouse 544 combinations. A network controller 534 may also couple to ICH 530. In some embodiments, a high-performance network controller (not shown) couples to processor bus 510. It will be appreciated that the system 500 shown is exemplary and not limiting, as other types of data processing systems that are differently configured may also be used. For example, the I/O controller hub 530 may be integrated within the one or more processor 502, or the memory controller hub 516 and I/O controller hub 530 may be integrated into a discreet external graphics processor, such as the external graphics processor 512.

Figure 6:
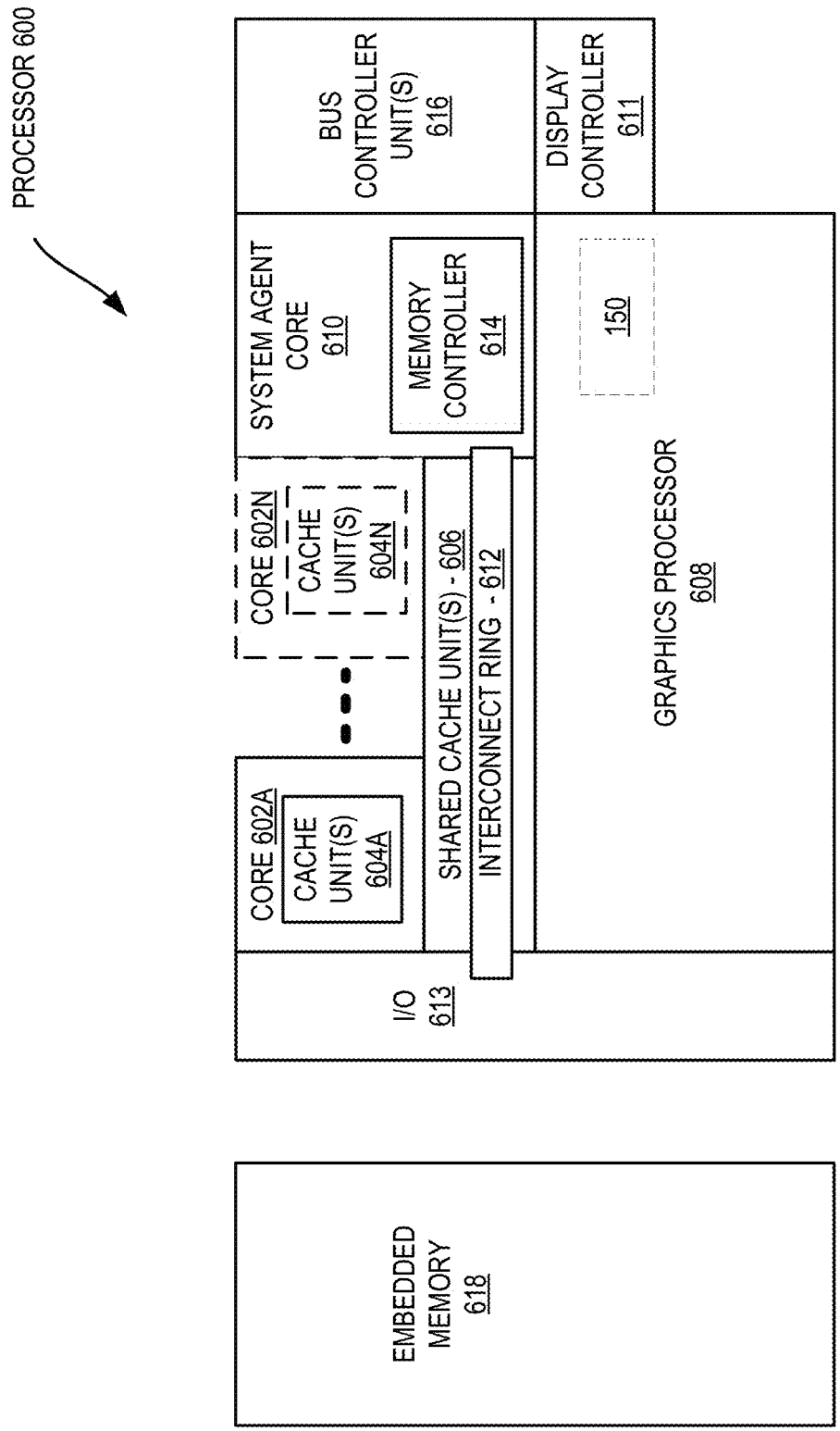
FIGS. 6 and 7 illustrate various components of processors in accordance with some embodiments.

FIG. 6 is a block diagram of an embodiment of a processor 600 having one or more processor cores 602A to 602N, an integrated memory controller 614, and an integrated graphics processor 608. Those elements of FIG. 6 having the same reference numbers (or names) as the elements of any other figure herein can operate or function in any manner similar to that described elsewhere herein, but are not limited to such. Processor 600 can include additional cores up to and including additional core 602N represented by the dashed lined boxes. Each of processor cores 602A to 602N includes one or more internal cache units 604A to 604N. In some embodiments each processor core also has access to one or more shared cached units 606.

The internal cache units 604A to 604N and shared cache units 606 represent a cache memory hierarchy within the processor 600. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 606 and 604A to 604N.

In some embodiments, processor 600 may also include a set of one or more bus controller units 616 and a system agent core 610. The one or more bus controller units 616 manage a set of peripheral buses, such as one or more Peripheral Component Interconnect buses (e.g., PCI, PCI Express). System agent core 610 provides management functionality for the various processor components. In some embodiments, system agent core 610 includes one or more integrated memory controllers 614 to manage access to various external memory devices (not shown).

In some embodiments, one or more of the processor cores 602A to 602N include support for simultaneous multi-threading. In such embodiment, the system agent core 610 includes components for coordinating and operating cores 602A to 602N during multi-threaded processing. System agent core 610 may additionally include a power control unit (PCU), which includes logic and components to regulate the power state of processor cores 602A to 602N and graphics processor 608.

In some embodiments, processor 600 additionally includes graphics processor 608 to execute graphics processing operations. In some embodiments, the graphics processor 608 couples with the set of shared cache units 606, and the system agent core 610, including the one or more integrated memory controllers 614. In some embodiments, a display controller 611 is coupled with the graphics processor 608 to drive graphics processor output to one or more coupled displays. In some embodiments, display controller 611 may be a separate module coupled with the graphics processor via at least one interconnect, or may be integrated within the graphics processor 608 or system agent core 610.

In some embodiments, a ring based interconnect unit 612 is used to couple the internal components of the processor 600. However, an alternative interconnect unit may be used, such as a point-to-point interconnect, a switched interconnect, or other techniques, including techniques well known in the art. In some embodiments, graphics processor 608 couples with the ring interconnect 612 via an I/O link 613.

The exemplary I/O link 613 represents at least one of multiple varieties of I/O interconnects, including an on package I/O interconnect which facilitates communication between various processor components and a high-performance embedded memory module 618, such as an eDRAM (or embedded DRAM) module. In some embodiments, each of the processor cores 602 to 602N and graphics processor 608 use embedded memory modules 618 as a shared Last Level Cache.

In some embodiments, processor cores 602A to 602N are homogenous cores executing the same instruction set architecture. In another embodiment, processor cores 602A to 602N are heterogeneous in terms of instruction set architecture (ISA), where one or more of processor cores 602A to 602N execute a first instruction set, while at least one of the other cores executes a subset of the first instruction set or a different instruction set. In one embodiment processor cores 602A to 602N are heterogeneous in terms of microarchitecture, where one or more cores having a relatively higher power consumption couple with one or more power cores having a lower power consumption. Additionally, processor 600 can be implemented on one or more chips or as an SoC integrated circuit having the illustrated components, in addition to other components.

Figure 7:
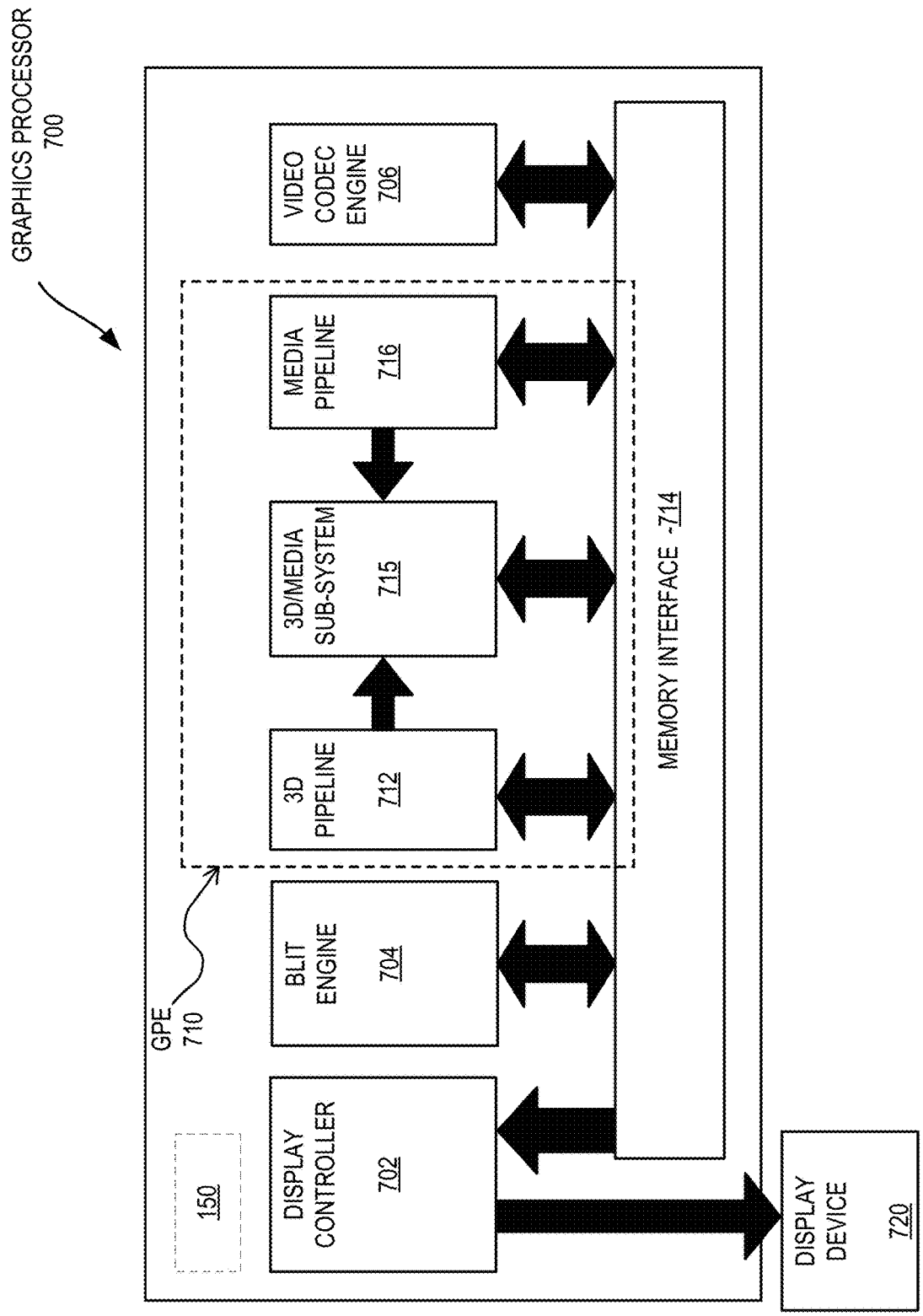

FIG. 7 is a block diagram of a graphics processor 700, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 700 includes a memory interface 714 to access memory. Memory interface 714 can be an interface to local memory, one or more internal caches, one or more shared external caches, and/or to system memory.

In some embodiments, graphics processor 700 also includes a display controller 702 to drive display output data to a display device 720. Display controller 702 includes hardware for one or more overlay planes for the display and composition of multiple layers of video or user interface elements. In some embodiments, graphics processor 700 includes a video codec engine 706 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 700 includes a block image transfer (BLIT) engine 704 to perform two-dimensional (2D) rasterizer operations including, for example, bit-boundary block transfers. However, in one embodiment, 7D graphics operations are performed using one or more components of graphics processing engine (GPE) 710. In some embodiments, graphics processing engine 710 is a compute engine for performing graphics operations, including three-dimensional (3D) graphics operations and media operations.

In some embodiments, GPE 710 includes a 3D pipeline 712 for performing 3D operations, such as rendering three-dimensional images and scenes using processing functions that act upon 3D primitive shapes (e.g., rectangle, triangle, etc.). The 3D pipeline 712 includes programmable and fixed function elements that perform various tasks within the element and/or spawn execution threads to a 3D/Media sub-system 715. While 3D pipeline 712 can be used to perform media operations, an embodiment of GPE 710 also includes a media pipeline 716 that is specifically used to perform media operations, such as video post-processing and image enhancement.

In some embodiments, media pipeline 716 includes fixed function or programmable logic units to perform one or more specialized media operations, such as video decode acceleration, video de-interlacing, and video encode acceleration in place of, or on behalf of video codec engine 706. In some embodiments, media pipeline 716 additionally includes a thread spawning unit to spawn threads for execution on 3D/Media sub-system 715. The spawned threads perform computations for the media operations on one or more graphics execution units included in 3D/Media sub-system 715.

In some embodiments, 3D/Media subsystem 715 includes logic for executing threads spawned by 3D pipeline 712 and media pipeline 716. In one embodiment, the pipelines send thread execution requests to 3D/Media subsystem 715, which includes thread dispatch logic for arbitrating and dispatching the various requests to available thread execution resources. The execution resources include an array of graphics execution units to process the 3D and media threads. In some embodiments, 3D/Media subsystem 715 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: a master core, coupled to a slave core, to execute one or more operations to support Advanced Driver Assistance Systems (ADA) or autonomous driving, wherein the master core and the slave core are to receive the same input signals; and core tightly couple logic to cause generation of a signal in response to comparison of a first output from the master core and a second output from the slave core, wherein the signal is to cause an interruption of the one or more operations in response to a mismatch between the first output and the second output. Example 2 includes the apparatus of example 1, wherein the first output includes a first checksum value and the second output includes a second checksum value, wherein the first checksum value corresponds to one or more bits output by the master core and the second check sum value corresponds to one or more bits output by the slave core. Example 3 includes the apparatus of example 1, comprising XOR logic to compare the first checksum value and the second checksum value. Example 4 includes the apparatus of example 1, comprising Uncore Functional Safety Mechanism (UCSF) logic to drive the input signals to both the master core and the slave core. Example 5 includes the apparatus of example 1, wherein a lock-stepped domain comprises the master core and the slave core, wherein the master core and the slave core are to communicate via UCSF logic. Example 6 includes the apparatus of example 1, wherein signals from one or more interfaces, coupled to the master core, are driven to the slave core over a fixed number of cycles. Example 7 includes the apparatus of example 6, comprising logic to compensate for transit time latency for transmission of the signals from the one or more interfaces to the slave core. Example 8 includes the apparatus of example 1, wherein output signals from the master core are to be propagated to a coherent fabric, while output signals from the slave core are dropped. Example 9 includes the apparatus of example 1, wherein the master core and the slave core are provided in one of: a vehicle or an Internet of Things (IoT) device. Example 10 includes the apparatus of example 9, wherein the vehicle comprises one of: an automobile, a truck, a motorcycle, an airplane, or a helicopter. Example 11 includes the apparatus of example 1, wherein a single integrated circuit device comprises one or more of: the master core, the salve core, the core tightly couple logic, and memory.

Example 12 includes one or more computer-readable medium comprising one or more instructions that when executed on at least one processor configure the at least one processor to perform one or more operations to cause: a master core, coupled to a slave core, to execute one or more operations to support Advanced Driver Assistance Systems (ADA) or autonomous driving, wherein the master core and the slave core are to receive the same input signals; and core tightly couple logic to cause generation of a signal in response to comparison of a first output from the master core and a second output from the slave core, wherein the signal is to cause an interruption of the one or more operations in response to a mismatch between the first output and the second output. Example 13 includes the one or more computer-readable medium of example 12, wherein the first output includes a first checksum value and the second output includes a second checksum value, wherein the first checksum value corresponds to one or more bits output by the master core and the second check sum value corresponds to one or more bits output by the slave core. Example 14 includes the one or more computer-readable medium of example 12, wherein the one or more computer-readable medium comprise one or more instructions that when executed on the at least one processor configure the at least one processor to perform one or more operations to cause XOR logic to compare the first checksum value and the second checksum value. Example 15 includes the one or more computer-readable medium of example 12, wherein the one or more computer-readable medium comprise one or more instructions that when executed on the at least one processor configure the at least one processor to perform one or more operations to cause Uncore Functional Safety Mechanism (UCSF) logic to drive the input signals to both the master core and the slave core. Example 16 includes the one or more computer-readable medium of example 12, wherein a lock-stepped domain comprises the master core and the slave core, wherein the master core and the slave core are to communicate via UCSF logic. Example 17 includes the one or more computer-readable medium of example 12, wherein the one or more computer-readable medium comprise one or more instructions that when executed on the at least one processor configure the at least one processor to perform one or more operations to cause signals from one or more interfaces, coupled to the master core, to be driven to the slave core over a fixed number of cycles. Example 18 includes the one or more computer-readable medium of example 12, wherein the one or more computer-readable medium comprise one or more instruc-tions that when executed on the at least one processor configure the at least one processor to perform one or more operations to cause output signals from the master core to be propagated to a coherent fabric, while output signals from the slave core are dropped. Example 19 includes the one or more computer-readable medium of example 12, wherein the master core and the slave core are provided in one of: a vehicle or an Internet of Things (IoT) device.

Example 20 includes a computing system comprising: a processor having one or more processor cores; memory, coupled to the processor, to store one or more bits of data; the one or more processor cores comprising a master core, coupled to a slave core, to execute one or more operations to support Advanced Driver Assistance Systems (ADA) or autonomous driving, wherein the master core and the slave core are to receive the same input signals; and core tightly couple logic to cause generation of a signal in response to comparison of a first output from the master core and a second output from the slave core, wherein the signal is to cause an interruption of the one or more operations in response to a mismatch between the first output and the second output. Example 21 includes the system of example 20, wherein the first output includes a first checksum value and the second output includes a second checksum value, wherein the first checksum value corresponds to one or more bits output by the master core and the second check sum value corresponds to one or more bits output by the slave core. Example 22 includes the system of example 20, comprising XOR logic to compare the first checksum value and the second checksum value. Example 23 includes the system of example 20, comprising Uncore Functional Safety Mechanism (UCSF) logic to drive the input signals to both the master core and the slave core. Example 24 includes the system of example 20, wherein a lock-stepped domain comprises the master core and the slave core, wherein the master core and the slave core are to communicate via UCSF logic. Example 25 includes the system of example 20, wherein signals from one or more interfaces, coupled to the master core, are driven to the slave core over a fixed number of cycles.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a master core, coupled to a slave core, to execute one or more operations to support Advanced Driver Assistance Systems(ADA) or autonomous driving, wherein the master core and the slave core are to receive the same input signals;
core tightly couple logic to cause generation of a signal in response to comparison of a first output from the master core and a second output from the slave core, wherein the signal is to cause an interruption of the one or more operations in response to a mismatch between the first output and the second output,
wherein a lock-stepped domain comprises the master core and the slave core and a non-deterministic domain comprises one or more memory controllers and one or more coherency controllers coupled to the one or more memory controllers; and
Uncore Functional Safety Mechanism (UCFS) logic to communicatively couple the lock-stepped domain and the non-deterministic domain to drive the input signals to both the master core and the slave core.

2. The apparatus of claim 1, wherein the first output includes a first checksum value and the second output includes a second checksum value, wherein the first checksum value corresponds to one or more bits output by the master core and the second check sum value corresponds to one or more bits output by the slave core.

3. The apparatus of claim 1, comprising XOR logic to compare the first checksum value and the second checksum value.

4. The apparatus of claim 1, wherein the master core and the slave core are to communicate via the UCFS logic.

5. The apparatus of claim 1, wherein signals from one or more interfaces, coupled to the master core, are driven to the slave core over a fixed number of cycles.

6. The apparatus of claim 5, comprising logic to compensate for transit time latency for transmission of the signals from the one or more interfaces to the slave core.

7. The apparatus of claim 1, wherein output signals from the master core are to be propagated to a coherent fabric, while output signals from the slave core are dropped.

8. The apparatus of claim 1, wherein the master core and the slave core are provided in one of: a vehicle or an Internet of Things(IoT) device.

9. The apparatus of claim 8, wherein the vehicle comprises one of: an automobile, a truck, a motorcycle, an airplane, or a helicopter.

10. The apparatus of claim 1, wherein a single integrated circuit device comprises one or more of: the master core, the slave core, the core tightly couple logic, and memory.

11. One or more non-transitory computer-readable medium comprising one or more instructions that when executed on at least one processor configure the at least one processor to perform one or more operations to cause:
   a master core, coupled to a slave core, to execute one or more operations to support Advanced Driver Assistance Systems(ADA) or autonomous driving, wherein the master core and the slave core are to receive the same input signals;
   core tightly couple logic to cause generation of a signal in response to comparison of a first output from the master core and a second output from the slave core, wherein the signal is to cause an interruption of the one or more operations in response to a mismatch between the first output and the second output,
   wherein a lock-stepped domain comprises the master core and the slave core and a non-deterministic domain comprises one or more memory controllers and one or more coherency controllers coupled to the one or more memory controllers; and
   Uncore Functional Safety Mechanism (UCFS) logic to communicatively couple the lock-stepped domain and the non-deterministic domain to drive the input signals to both the master core and the slave core.

12. The one or more non-transitory computer-readable medium of claim 11, wherein the first output includes a first checksum value and the second output includes a second checksum value, wherein the first checksum value corresponds to one or more bits output by the master core and the second check sum value corresponds to one or more bits output by the slave core.

13. The one or more non-transitory computer-readable medium of claim 11, wherein the one or more computer-readable medium comprise one or more instructions that when executed on the at least one processor configure the at least one processor to perform one or more operations to cause XOR logic to compare the first checksum value and the second checksum value.

14. The one or more non-transitory computer-readable medium of claim 11, wherein the master core and the slave core are to communicate via the UCFS logic.

15. The one or more non-transitory computer-readable medium of claim 11, wherein the one or more computer-readable medium comprise one or more instructions that when executed on the at least one processor configure the at least one processor to perform one or more operations to cause signals from one or more interfaces, coupled to the master core, to be driven to the slave core over a fixed number of cycles.

16. The one or more non-transitory computer-readable medium of claim 11, wherein the one or more computer-readable medium comprise one or more instructions that when executed on the at least one processor configure the at least one processor to perform one or more operations to cause output signals from the master core to be propagated to a coherent fabric, while output signals from the slave core are dropped.

17. The one or more non-transitory computer-readable medium of claim 11, wherein the master core and the slave core are provided in one of: a vehicle or an Internet of Things(IoT) device.

18. A computing system comprising:
   a processor having one or more processor cores;
   memory, coupled to the processor, to store one or more bits of data;
   the one or more processor cores comprising a master core, coupled to a slave core, to execute one or more operations to support Advanced Driver Assistance Systems (ADA) or autonomous driving, wherein the master core and the slave core are to receive the same input signals;
   core tightly couple logic to cause generation of a signal in response to comparison of a first output from the master core and a second output from the slave core, wherein the signal is to cause an interruption of the one or more operations in response to a mismatch between the first output and the second output,
   wherein a lock-stepped domain comprises the master core and the slave core and a non-deterministic domain comprises one or more memory controllers and one or more coherency controllers coupled to the one or more memory controllers; and
   Uncore Functional Safety Mechanism (UCFS) logic to communicatively couple the lock-stepped domain and the non-deterministic domain to drive the input signals to both the master core and the slave core.

19. The system of claim 18, wherein the first output includes a first checksum value and the second output includes a second checksum value, wherein the first checksum value corresponds to one or more bits output by the master core and the second check sum value corresponds to one or more bits output by the slave core.

20. The system of claim 18, comprising XOR logic to compare the first checksum value and the second checksum value.

21. The system of claim 18, wherein the master core and the slave core are to communicate via the UCFS logic.

22. The system of claim 18, wherein signals from one or more interfaces, coupled to the master core, are driven to the slave core over a fixed number of cycles.

* * * * *